US009625697B2

United States Patent
Bach

(10) Patent No.: US 9,625,697 B2
(45) Date of Patent: Apr. 18, 2017

(54) OPTICAL SYSTEM FOR IMAGING AN OBJECT AND METHOD FOR OPERATING SAID OPTICAL SYSTEM

(71) Applicant: Carl Zeiss Sports Optics GmbH, Wetzlar (DE)

(72) Inventor: Christian Bach, Buseck (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 14/759,995

(22) PCT Filed: Jan. 8, 2014

(86) PCT No.: PCT/EP2014/050200
§ 371 (c)(1),
(2) Date: Jul. 9, 2015

(87) PCT Pub. No.: WO2014/108426
PCT Pub. Date: Jul. 17, 2014

(65) Prior Publication Data
US 2015/0355476 A1    Dec. 10, 2015

Related U.S. Application Data

(60) Provisional application No. 61/751,402, filed on Jan. 11, 2013.

(30) Foreign Application Priority Data

Jan. 11, 2013    (DE) .................. 10 2013 200 312

(51) Int. Cl.
G02B 27/64    (2006.01)
G02B 26/08    (2006.01)
G02B 23/02    (2006.01)

(52) U.S. Cl.
CPC .......... *G02B 23/02* (2013.01); *G02B 26/0883* (2013.01); *G02B 27/646* (2013.01); *G03B 2205/0007* (2013.01)

(58) Field of Classification Search
CPC .. G02B 23/02; G02B 26/0883; G02B 27/646; G03B 2205/0007; G03B 2205/0015;
(Continued)

(56) References Cited

U.S. PATENT DOCUMENTS 4,465,346 A    8/1984 Fraser
6,130,709 A    10/2000 Sekine et al.
(Continued)

FOREIGN PATENT DOCUMENTS

DE    23 53 101 C3    5/1974
DE    39 33 255 A1    5/1991
(Continued)

*Primary Examiner* — Frank Font
(74) *Attorney, Agent, or Firm* — Muirhead and Saturnelli, LLC

(57) ABSTRACT

An optical system for imaging an object includes a objective, an image stabilizing unit, an image plane and a drive unit, which is arranged at the image stabilizing unit and provided for moving the image stabilizing unit. The optical system includes a control unit. A signal from the control unit is forwarded to a first high-pass filter. The control unit has an output line and the high-pass filter has a filter output line. Both the output line and the filter output line are arranged at an addition unit such that an actuation signal from the control unit and an output signal from the high-pass filter are added to produce an addition signal. The addition unit is arranged at the drive unit in such a way that the addition signal is used for actuating the drive unit and for moving the image stabilizing unit.

19 Claims, 8 Drawing Sheets

(58) Field of Classification Search
CPC ...... G03B 2205/0023; G03B 2205/003; G03B 2205/0038
USPC ........................................................ 359/407
See application file for complete search history.

(56) References Cited

U.S. PATENT DOCUMENTS

| | | | |
|---|---|---|---|
| 6,414,793 | B1 | 7/2002 | Ishijima et al. |
| 7,460,154 | B2 | 12/2008 | Kawahara |
| 2009/0040612 | A1* | 2/2009 | Ota ................ G02B 27/646 359/554 |
| 2009/0086033 | A1* | 4/2009 | Watanabe ............. G03B 5/00 348/208.2 |
| 2011/0013031 | A1* | 1/2011 | Miyasako ......... G02B 27/646 348/208.99 |
| 2011/0102609 | A1 | 5/2011 | Iwata |
| 2011/0115926 | A1* | 5/2011 | McLeod ........... G02B 27/646 348/208.1 |
| 2011/0157381 | A1* | 6/2011 | Miyasako ......... G02B 27/646 348/208.5 |
| 2011/0157385 | A1* | 6/2011 | Hoshino .............. G03B 3/00 348/208.99 |
| 2013/0063615 | A1* | 3/2013 | Takeuchi ......... H04N 5/23258 348/208.5 |
| 2013/0071099 | A1* | 3/2013 | Imada ............. G02B 27/646 396/55 |

FOREIGN PATENT DOCUMENTS

| | | |
|---|---|---|
| DE | 40 42 241 A1 | 7/1992 |
| EP | 1 596 583 A2 | 11/2005 |
| JP | H07-199122 A | 8/1995 |

\* cited by examiner

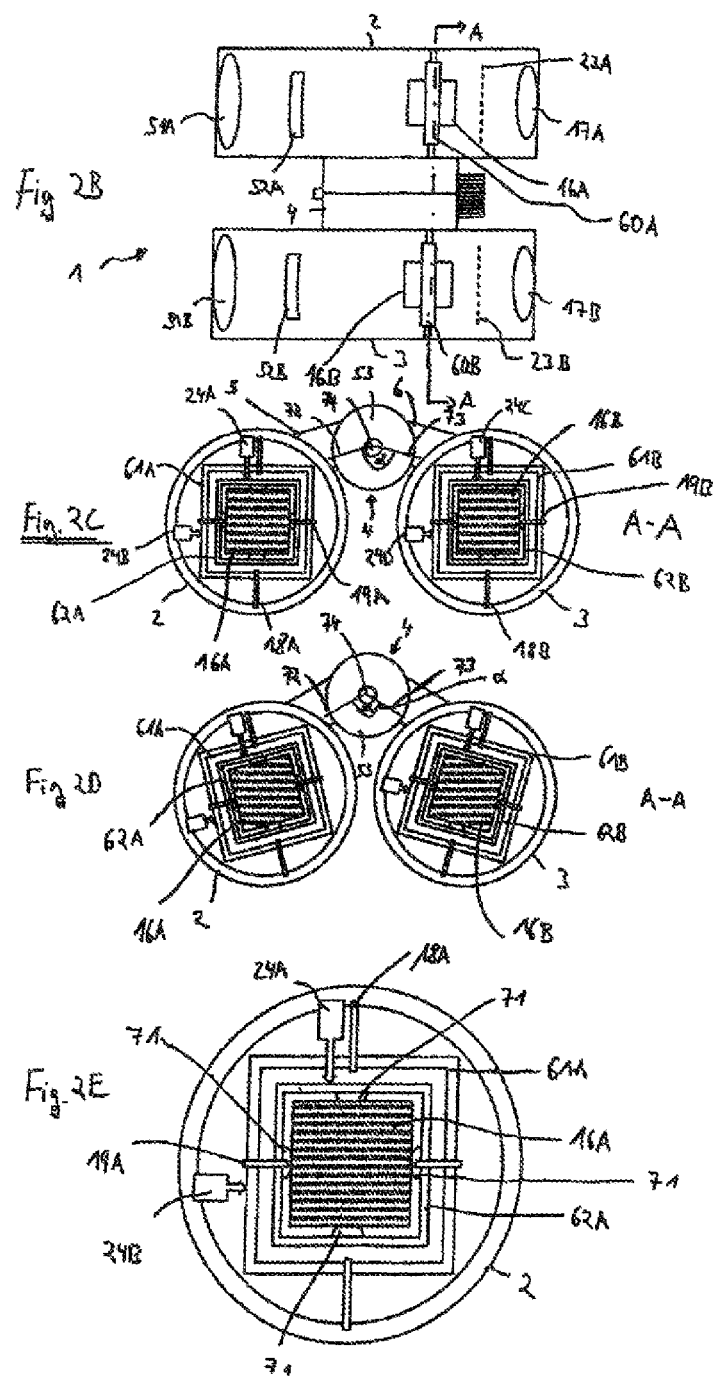

OPTICAL SYSTEM FOR IMAGING AN OBJECT AND METHOD FOR OPERATING SAID OPTICAL SYSTEM

TECHNICAL FIELD

The system described herein relates to an optical system for imaging an object and to a method for operating said optical system.

BACKGROUND OF THE INVENTION

Optical systems may be used, for example, in a telescope or in field glasses. By way of example, optical systems in the form of field glasses are known, which have two housings in the form of two tubes. A first imaging unit having a first optical axis is arranged in a first tube. A second imaging unit having a second optical axis is arranged in a second tube. Moreover, the prior art has disclosed field glasses which have a first housing in the form of a first tube with a first optical axis and a second housing in the form of a second tube with a second optical axis. The first housing is connected to the second housing by way of a folding bridge, with the folding bridge having a first hinge part arranged at the first housing and the folding bridge having a second hinge part arranged at the second housing. The folding bridge has a folding axis. If the two housings pivoted relative to one another about the folding axis, there is a change in the distance between the two housings.

The image captured by an observer through the telescope or the field glasses is often perceived to be shaking because trembling movements or rotational movements of the hands of the user, and also movements underfoot, in turn cause movements of the optical system. In order to avoid this, it is known to stabilize images in an optical system. Known solutions use stabilizing apparatuses for stabilizing the image by means of a mechanical apparatus and/or an electronic apparatus.

DE 23 53 101 C3 has disclosed an optical system in the form of a telescope, which has an objective, an image stabilizing unit in the form of a prism erecting system and an eyepiece. The prism erecting system is mounted in Cardan-joint fashion in a housing of the telescope. This is understood to mean that the prism erecting system is arranged in the housing of the telescope such that the prism erecting system is mounted such that it can rotate about two axes arranged at right angles to one another. For the rotatable mounting, use is generally made of a device which is referred to as a Cardan-type mount. A hinge point of the erecting system, mounted in a Cardan-joint fashion in the housing, is arranged centrally between an image-side main plane of the objective and an object-side main plane of the eyepiece. The prism erecting system, mounted in a Cardan-joint fashion, is not moved by occurring rotational movements as a result of its inertia. It therefore remains fixed in space. This is how an image deterioration which occurs as a result of the movement of the housing is compensated for.

DE 39 33 255 C2 discloses binocular field glasses with an image stabilizing unit having a prism erecting system. The prism erecting system has Porro prisms, which respectively have one tilt axis. The Porro prisms are designed such that they can pivot about their respective tilt axis. Motors are provided for pivoting the Porro prisms. The pivoting is brought about dependent on a trembling movement which causes a shaking of an observed image.

Furthermore, U.S. Pat. No. 6,414,793 B1 has disclosed further binocular field glasses with an image stabilizing unit. U.S. Pat. No. 7,460,154 B2 has disclosed a device for compensating vibrations using a coordinate transformation.

As mentioned above, drive units (actuators) move the image stabilizing unit or at least one optical element of the image stabilizing unit in some of the known optical systems. These drive units are controlled by way of actuation signals, which are provided by a control unit or by a plurality of control units. As a result of the inertia of the mass of the image stabilizing unit or of the optical element of the image stabilizing unit, there is, in this case, a time delay between the initiation of the movement by the actuation signal in the drive units and the implementation of the actual movement of the image stabilizing unit or of the optical element of this image stabilizing unit. Consequently, the image stabilization in relation to, for example, an occurring trembling movement, is implemented with some time delay. This can have an influence on the quality of the image stabilization, as will be explained below.

In a simplified approach, the trembling movement can be considered to be a composition of numerous sinusoidal vibrations with different frequencies. If now only a single sinusoidal vibration with a specific frequency from the spectrum of numerous frequencies is considered, the above-described time delay leads to a shift in the phase between the phase of the actuation signal and the phase of the movement of the image stabilizing unit or of the optical element of the image stabilizing unit. Expressed differently, the time delay also leads to a shift in the phase between the trembling movement to be stabilized and the movement of the image stabilizing unit or of the optical element of the image stabilizing unit. This then also has an influence on a movement of the image of an object in the optical system, e.g. field glasses.

The shift in the phase increases with increasing frequency of the actuation signal. In the case of a very high frequency of the actuation signal, the shift in the phase is so high that the movement of the image stabilizing unit or of the optical element of the image stabilizing unit emerges in such a shifted manner that the movement of the image stabilizing unit or of the optical element of the image stabilizing unit does not suffice for compensating the trembling movement. The trembling movement and the movement of the image due to the image stabilization are clearly perceived.

What was mentioned above can be elucidated on the basis of FIGS. 8 and 9. FIGS. 8 and 9 plot the amplitudes of the vibrations of the movement of the image stabilizing unit or of the optical element of the image stabilizing unit, of the actuation signal and the visible difference emerging in the optical system from these vibrations over time. In the case of a delay in the onset of the movement of the image stabilizing unit or of the optical element of the image stabilizing unit of 5% of the period duration of the actuation signal, a movement of the image in the optical system of approximately 30% of the original trembling movement is generated (FIG. 8). In the case of a delay in the onset of the movement of the image stabilizing unit or of the optical element of the image stabilizing unit of 12.5% (corresponding to 45°) of the period duration of the actuation signal, the emerging visible difference is just as large as the actuation signal. Accordingly, the image of the object (i.e. the image) will move with an amplitude during the image stabilization that corresponds to the amplitude of the trembling movement. This is clearly visible to an observer. Then, this can no longer be referred to as image stabilization.

A further disadvantage of the aforementioned inertia is that the amplitude of the movement of the image stabilizing unit or of the optical element of the image stabilizing unit becomes smaller with increasing frequency. Expressed differently, a delayed movement of the image stabilizing unit or of the optical element of the image stabilizing unit with movements that are too small follows a quick change in the actuation signal.

Optical units which implement monitoring of the position of the image stabilizing unit or of the optical element of the image stabilizing unit and the closed-loop control thereof following an actuation signal are known for the purposes of avoiding the aforementioned problems. To this end, use is made of a PID control. The amplitudes of the movement of the image stabilizing unit or of the optical element of the image stabilizing unit are adapted by means of the PID control. Furthermore, it is possible to counteract the phase shift. However, the PID control should be able to control quickly. In order to be able to react to deviations from an intended value of an actuation signal, an excessively strong drive unit is used as a result of the above-described inertia problem. However, a drive unit with such a design requires much energy and installation space. Furthermore, it was found oscillatory phenomena occur in the case of the fast closed-loop control by means of the PID control which, firstly, reduce the quality of the image stabilization and, secondly, likewise increase the energy consumption.

Accordingly it is desirable to provide an optical system and a method for operating the optical system, in which the drive unit can be designed in such a way that it works in an energy efficient manner.

SUMMARY OF THE INVENTION

The optical system described herein is embodied for imaging an object. By way of example, the optical system is embodied as binocular field glasses or a binocular telescope. However, reference is explicitly made to the fact that the system described herein is not restricted to such an optical system.

The optical system according to the system described herein has at least one first objective, at least one first image stabilizing unit and at least one first image plane, wherein, as seen from the first objective in the direction of the first image plane, the first objective is arranged first along a first optical axis, followed by the first image stabilizing unit and the first image plane. Accordingly, the aforementioned units are arranged in the following sequence along the first optical axis: first objective-first image stabilizing unit-first image plane.

Furthermore, the optical system according to the system described herein has at least one first drive unit, which is arranged at the first image stabilizing unit and provided for moving the first image stabilizing unit. Moreover, the optical system according to the system described herein has at least one first control unit for actuating the first drive unit. Here, the control unit provides a control signal. The control signal determines the movement of the first image stabilizing unit or of an optical element of the image stabilizing unit, for example the direction, the amplitude and the speed of the movement.

In the optical system according to the system described herein, provision is now made for a first high-pass filter to be connected between the first control unit and the first drive unit. This is understood to mean that the first high-pass filter is connected directly, or indirectly via further units, to the first control unit and the first drive unit (this definition subsequently applies to further units of the optical system in an analogous manner). The first control unit furthermore has a first output line and the first high-pass filter has a first filter output line. Both the first output line and the first filter output line are arranged at a first addition unit. Therefore, the first control unit is connected via a line to the first high-pass filter and via the first output line to the first addition unit. Accordingly, the first control unit feeds a first control signal both to the first high-pass filter and to the first addition unit. The first addition unit is arranged at the first drive unit.

The system described herein is based on the surprising discovery that the aforementioned problem can be solved if the inertia of the first image stabilizing unit or of an optical element of the first image stabilizing unit is already taken into account in the actuation signal in such a way that the above-described delay disappears or is at least reduced to an acceptable level. This is achieved by virtue of the output signal of the first high-pass filter and the actuation signal of the first control unit initially being added. The first addition signal generated hereby is now used in the first drive unit for actuating the first drive unit and moving the first image stabilizing unit or the optical element of the first image stabilizing unit. By way of example, what was mentioned above can be described by the following equation:

$$x'=x+\gamma \cdot HP(x), \quad \text{[Equation 1]}$$

where x is the first control signal from the first control unit (i.e. the original actuation signal), HP(x) is the filter signal from the first high-pass filter as a function of the first control signal, γ is a constant factor and where x' is the first addition signal from the first addition unit, which is fed to the first drive unit as first actuation signal.

The optical system according to the system described herein has two advantages. Firstly, the phase of a high-frequency first control signal (e.g. in the range from 5 Hz to 20 Hz, with the system not been restricted to this range) is shifted forward in time by means of the optical system according to the system described herein. As a result of this, the delayed movement due to the above-described inertia is compensated for. Secondly, the amplitude of the high-frequency first control signal is increased, as a result of which the reduction in amplitude due to inertia (see above) is compensated for. In order to achieve this, a limit frequency for the first high-pass filter and a factor γ are established, for example by experiment, prior to the operation of the optical system in such a way that the delay is sufficiently well compensated for and the amplitude of the movement is not substantially reduced. By way of example, 5% of the period duration of the vibration is selected as a limit so as to obtain sufficient compensation. When using the optical system according to the system described herein, it is possible to dispense with closed-loop control as provided for by the prior art, and so energy is saved. However, even if closed-loop control (e.g. a PID control) were additionally provided at the optical system according to the system described herein, this closed-loop control by the inertia, compensated in the actuation signal, of the first image stabilizing unit would only still compensate substantially smaller deviations (e.g. only still 30%) from a predeterminable actuation curve than without compensation. However, these deviations are relatively small, and so only relatively small movements are required for compensating for these deviations. However, setting small movements only requires a low energy consumption.

In one embodiment of the system described herein, provision is additionally or alternatively made in the optical system according to the system described herein for the first control unit to have at least one low-pass filter. In an in turn further exemplary embodiment, provision is made for the first control unit to additionally have at least one first integration unit, which is connected downstream of the first low-pass filter. Expressed differently, the first low-pass filter and the first integration unit are arranged in such a way that a signal initially passes through the low-pass filter and only subsequently passes through the first integration unit. In an in turn further embodiment of the optical system according to the system described herein, provision is additionally or alternatively made for a first damping unit to be connected between the first high-pass filter and the first drive unit. This is understood to mean that the first damping unit is connected directly, or indirectly via further units, to the first high-pass filter and the first drive unit.

The above-described embodiment of the optical system according to the system described herein is based on the following considerations. The movements of the optical system, in particular due to trembling of the hand and/or pivoting, can be represented by a measurement of the spectrum of the movement frequencies. This measured spectrum then serves as a basis for generating actuation signals for the first image stabilizing unit. To this end, the measured spectrum is initially further evaluated and/or filtered, with filtering for example filtering out frequencies of movements not requiring any image stabilization. The measured spectrum of the movement frequencies lies e.g. in the frequency range from 0 Hz to 20 Hz. Image stabilization can be performed well in the frequency range from 0 Hz to 15 Hz. The efficiency of the image stabilization reduces drastically with increasing frequency for frequencies over 15 Hz. The considerations have therefore yielded that no image stabilization should be performed for movements with high frequencies, e.g. greater than 20 Hz, due to the lack of efficiency. By means of the first low-pass filter it is possible to filter out and eliminate these high frequencies, e.g. frequencies greater than 20 Hz. The measured and now filtered spectrum then only still comprises movements with frequencies in the range from 0 Hz to 20 Hz. The filtered spectrum is now fed to the first high-pass filter. By using the first high-pass filter and appropriate software, it is now possible to establish what types of movement are still contained in the filtered spectrum so as then to perform image stabilization depending on the identified type. In the process, a distinction is made between e.g. two types of movements. The first type of movement occurs when observing stationary objects (i.e. objects which are not in motion). These movements have small amplitudes at low frequencies (e.g. in the range from 0 Hz to 2 Hz), which then increase for movements with frequencies up to 5 Hz and are then constant for movements with frequencies up to 8 Hz. The second type of movement occurs in the case of desired pivoting of the optical system. The amplitudes increase strongly for movements with low frequencies in the range from 0 Hz to 2 Hz, with these amplitudes by all means being greater than the amplitudes of movements with a frequency from 5 Hz to 10 Hz. If pivoting is identified (if the amplitudes increase greatly in the case of movements with frequencies from 0 Hz to 2 Hz), there hardly are any low frequencies left in the spectrum during the filtering by the first high-pass filter. This causes the remaining high frequencies to control the movement of the first image stabilizing unit, to be precise in such a way that image stabilization is undertaken less and less, the more the optical system is deliberately pivoted.

Furthermore, in the aforementioned embodiment of the system described herein, the assumption is made that wanted pivoting of the optical system according to the system described herein is characterized by, in particular, two properties. First of all, this is the already aforementioned low frequency of the wanted pivoting, but it is also a large amplitude of the wanted pivoting. This is because unwanted pivoting, in particular trembling movements, generally have a much smaller amplitude than a wanted pivoting of the optical system. It was identified that the amplitude of the wanted pivoting can additionally or alternatively be included for determining (identifying) the type of movement of the optical system. In this embodiment of the optical system according to the system described herein, provision is additionally or alternatively made for the first control unit to have the first integration unit which is connected downstream of the first low-pass filter. In particular, provision is made in this exemplary embodiment of the optical system according to the system described herein for the first integration unit to have at least one first input line with at least one first input signal and at least one first output line with at least one first output signal, wherein the first output signal is determined by the following equation:

$$\Sigma(t_2) = \gamma(\Sigma(t_1)) \cdot \Sigma(t_1) + \alpha(t_1),$$ [Equation 2]

where
$\alpha(t_1)$ is the first input signal at a first time $t_1$,
$\Sigma(t_1)$ is the first output signal at the first time $t_1$,
$\gamma(\Sigma(t_1))$ is a function for controlling a time control of the first output signal to the value zero, which is dependent on the first output signal at the first time $t_1$, and
$\Sigma(t_2)$ is the first output signal at a second time $t_2$.

What was surprisingly identified for this exemplary embodiment is that the parameter $\gamma$ can be varied in a nonlinear manner depending on the amplitude of the pivoting of the optical system. The integration by means of the first integration unit is then implemented in a nonlinear manner such that the first output signal of the first integration unit leads to a decreasing stabilization by the image stabilizing unit as the speed of the pivoting of the optical system reduces and the deflection (amplitude) of the pivoting increases. Expressed differently, the compensation of the trembling movement (i.e. the image stabilization caused by the trembling movement) is "intrinsically adapted" in this manner, i.e. matched within the identification unit as a function of the amplitude of the pivoting of the optical system. The image stabilization is implemented as a function of the (wanted) pivoting of the optical system, wherein in the case of image stabilization substantially or exclusively only relatively high-frequency movements are filtered out of the image tremor during the deliberate pivoting of the optical system (i.e. during the movement of the optical system). Low-frequency movements in the measured spectrum are not filtered out of the image tremor. In this respect, reference is also made to the discussion above.

In a further embodiment of the system described herein, provision is additionally or alternatively made in the optical system according to the system described herein for the optical system to have at least one second drive unit, which is arranged at the first image stabilizing unit and provided for moving the first image stabilizing unit. The second drive unit can be connected to, and interact with, the first control unit like the first drive unit and the first control unit are connected to, and interact with, one another.

In an in turn further embodiment of the optical system according to the system described herein, provision is additionally or alternatively made for the optical system to have the following features:
at least one second objective,
at least one second image stabilizing unit, and
at least one second image plane.

As seen from the second objective in the direction of the second image plane, provision is made for the second objective to be arranged first along a second optical axis, followed by the second image stabilizing unit and the second image plane. Therefore, the aforementioned units are arranged in the following sequence along the second optical axis: second objective-second image stabilizing unit-second image plane. By way of example, the aforementioned embodiment of the optical system is embodied as a binocular optical system, in particular as binocular field glasses or as a binocular telescope. Accordingly, it has two imaging units, namely a first imaging unit (with the first objective, the first image stabilizing unit and the first image plane) and a second imaging unit (with the second objective, the second image stabilizing unit and the second image plane).

Furthermore, provision is made in the optical system according to the system described herein for a third drive unit, which is arranged at the second image stabilizing unit and provided for moving the second image stabilizing unit. By way of example, the third drive unit is connected to the first control unit, and interacts with the first control unit, in the same way as the first drive unit.

In an in turn further exemplary embodiment of the optical system according to the system described herein, provision is additionally or alternatively made for the optical system to have at least one second control unit for actuating the third drive unit,
a second high-pass filter to be connected between the second control unit and the third drive unit,
the second control unit to have a second output line,
the second high-pass filter to have a second filter output line,
both the second output line and the second filter output line to be arranged at a second addition unit, and for
the second addition unit to be arranged at the third drive unit.

In respect of the advantages and effects, reference is made to the explanations in respect of the first control unit and the first drive unit. These explanations apply analogously to the second control unit and the third drive unit.

In a further exemplary embodiment of the optical system according to the system described herein, provision is additionally or alternatively made for the second control unit to have at least one second low-pass filter and for the second control unit to have at least one second integration unit, which is connected downstream of the second low-pass filter. Furthermore, provision is additionally or alternatively made for a second damping unit to be connected between the second high-pass filter and the third drive unit. In respect of the advantages and effects, reference is made to the explanations above in relation to the first low-pass filter. These explanations also apply analogously to the second low-pass filter.

In an even further exemplary embodiment of the optical system according to the system described herein, provision is additionally or alternatively made for the optical system to have at least one fourth drive unit, which is arranged at the second image stabilizing unit and provided for moving the second image stabilizing unit. The fourth drive unit can be connected to, and interact with, the second control unit like the third drive unit is connected to, and interacts with, the second control unit.

In an in turn further exemplary embodiment of the optical system according to the system described herein, provision is additionally or alternatively made for the first objective, the first image stabilizing unit and the first image plane to be arranged in a first housing and for the second objective, the second image stabilizing unit and the second image plane to be arranged in a second housing. By way of example, provision is additionally made for the first housing to be connected to the second housing by means of at least one folding bridge, for the folding bridge to have a first hinge part arranged at the first housing, and for the folding bridge to have a second hinge part arranged at the second housing. The folding bridge has a folding axis. If the two housings are pivoted relative to one another about the folding axis, the distance between the two housings changes.

In an in turn further embodiment of the optical system according to the system described herein, at least one first movement detector for detecting a movement of the optical system is arranged at the first control unit. Additionally or alternatively to this, provision is made for at least one second movement detector for detecting a movement of the optical system to be arranged at the second control unit. The first movement detector and/or the second movement detector can, for example, be embodied as an angular-velocity detector. However, reference is explicitly made to the fact that the system described herein is not restricted to an angular-velocity detector. Rather, any suitable movement detector can be used in the system described herein.

The system described herein also relates to a method for operating an optical system, which has at least one of the features described above or in the following text, or a combination of at least two of the features described above or in the following text. In the method according to the system described herein, a first control signal of the first control unit is fed to a first high-pass filter. Furthermore, a first filter signal is generated by the first high-pass filter. The first filter signal and the first control signal are added, as a result of which a first actuation signal is generated. The first actuation signal is fed to the first drive unit for moving the first image stabilizing unit.

By way of example, what was stated above also applies to the second drive unit, the third drive unit, and the fourth drive unit in an analogous manner.

BRIEF DESCRIPTION OF THE DRAWINGS

Embodiments of the system described herein will be explained herein on the basis of the figures, which are briefly described as follows.

FIG. 2B shows a third schematic illustration of the field glasses according to FIG. 1A;

FIG. 2C shows a first sectional illustration of the field glasses along the line A-A as per FIG. 2B;

FIG. 2D shows a second sectional illustration of the field glasses along the line A-A as per FIG. 2B;

FIG. 2E shows a magnified sectional illustration of an image stabilizing unit of the field glasses as per FIGS. 2C and 2D;

In the following text, the invention will be discussed on the basis of an optical system in the form of binocular field glasses 1 (only referred to as field glasses below). However, reference is explicitly made to the fact that the invention is not restricted to binocular field glasses. Rather, the invention is suitable for any optical system, for example also in the case of a telescope.

DETAILED DESCRIPTION OF VARIOUS EMBODIMENTS

Figure 1A:
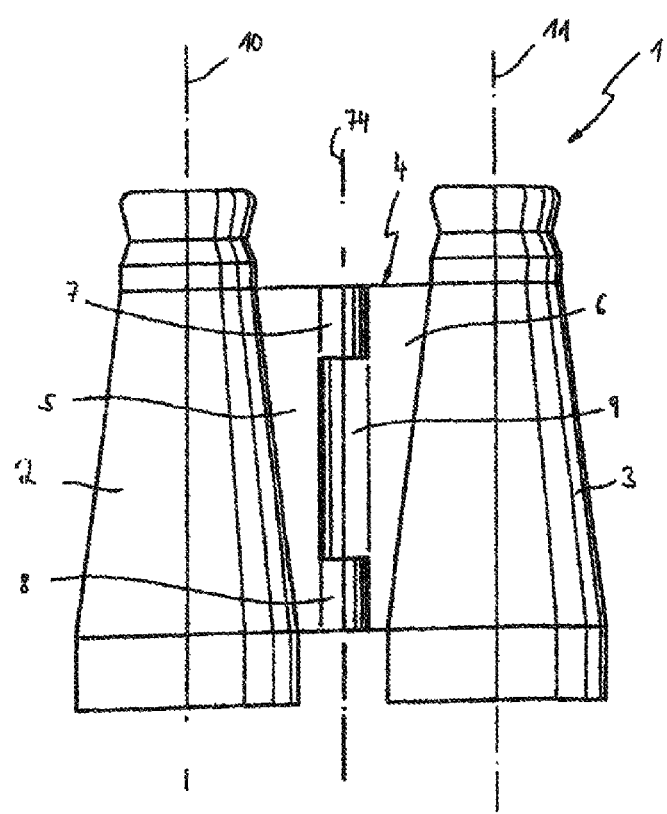
FIG. 1A shows a first schematic illustration of an optical system in the form of field glasses with a folding bridge.

FIG. 1A shows a first schematic illustration of the field glasses 1, which have a tube-shaped first housing part 2 and a tube-shaped second housing part 3. A first optical axis 10 extends through the first housing part 2. By contrast, a second optical axis 11 extends through the second housing part 3. The first housing part 2 is connected to the second housing part 3 by means of a folding bridge 4. The folding bridge 4 has a first hinge part 5, which is formed onto the first housing part 2. Furthermore, the folding bridge 4 has a second hinge part 6, which is arranged on the second housing part 3. The first hinge part 5 has a first holding part 7 and a second holding part 8, between which a third holding part 9 of the second hinge part 6 is arranged. An axle pin (not illustrated) extends through the first holding part 7, the second holding part 8 and the third holding part 9 such that the relative position of the first housing part 2 and the second housing part 3 can be set with respect to one another about an articulation axis 74. This renders it possible to set the first housing part 2 and the second housing part 3 to the intraocular distance of a user such that, firstly, the first housing part 2 is arranged in front of one of the two eyes of the user and such that, secondly, the second housing part 3 is arranged in front of the other one of the two eyes of the user.

Figure 1B:
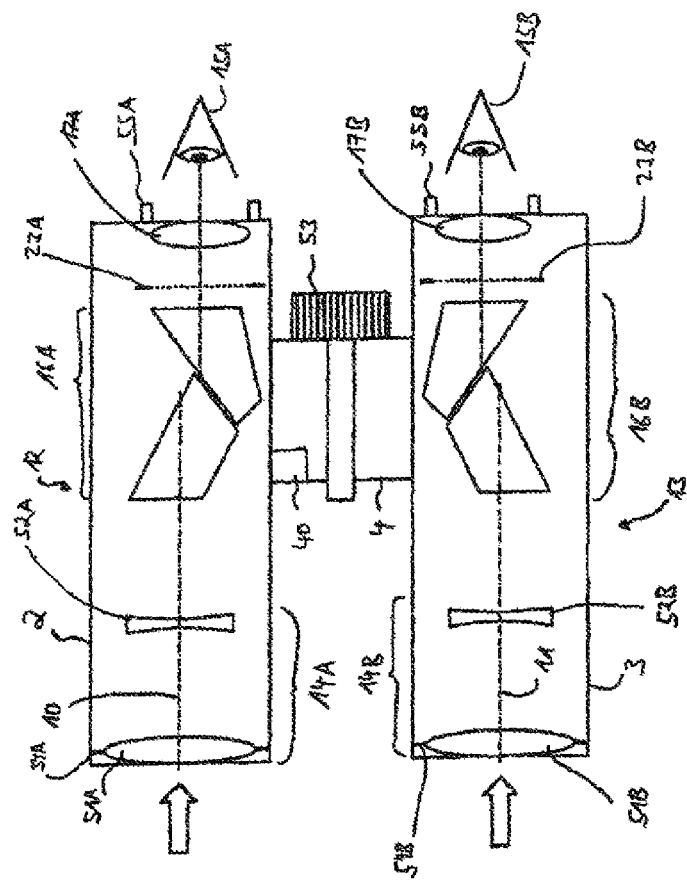
FIG. 1B shows a second schematic illustration of the field glasses according to FIG. 1A.
Figure 1B:

FIG. 1B shows a further illustration of the field glasses 1. The first housing part 2 has a first optical subsystem 12. The first optical subsystem 12 is provided with a first objective 14A, with a first image stabilizing unit 16A embodied as a first prism system and with a first eyepiece 17A. A first eye 15A of a user can be arranged in front of the first eyepiece 17A for the purpose of observing an object O. The first optical axis 10 of the first optical subsystem 12 is slightly offset laterally as a result of the first prism system 16A (first image stabilizing unit 16A), and so the first optical axis 10 has a step-like embodiment.

In this exemplary embodiment, the first objective 14A consists of a first front unit 51A and a first focusing unit 52A. Further embodiments of the first objective 14A provide for a different number of individual lenses or cemented components consisting of lenses. For the purposes of focusing the object O observed through the field glasses 1, it is possible to displace either the first eyepiece 17A or the first focusing unit 52A axially along the first optical axis 10. In a further embodiment, the first front unit 51A or even the whole first objective 14A is displaced along the first optical axis 10. In a further embodiment, the first front unit 51A and the first focusing unit 52A are displaced relative to one another.

The second housing part 3 has a second optical subsystem 13. The second optical subsystem 13 is provided with a second objective 14B, with a second image stabilizing unit 16B embodied as a prism system and with a second eyepiece 17B. A second eye 15B of the user can be arranged in front of the second eyepiece 17B for the purpose of observing the object O. The second optical axis 11 of the second optical subsystem 13 is slightly offset laterally as a result of the second image stabilizing unit 16B (prism system), and so the second optical axis 11 has a step-like embodiment.

In this exemplary embodiment, the second objective 14B consists of a second front unit 51B and a second focusing unit 52B. Further embodiments of the second objective 14B provide for a different number of individual lenses or cemented components consisting of lenses. For the purposes of focusing the object O observed through the field glasses 1, it is possible to displace either the second eyepiece 17B or the second focusing unit 52B axially along the second optical axis 11. In a further embodiment, the second front unit 51B or even the whole second objective 14B is displaced along the second optical axis 11. In a further embodiment, the second front unit 51B and the second focusing unit 52B are displaced relative to one another.

In both of the optical subsystems 12, 13 illustrated above, the beam direction of the light beams incident into the optical subsystems 12, 13 is as follows: object O-objective 14A, 14B-image stabilizing unit (prism system) 16A, 16B-eyepiece 17A, 17B-eye 15A, 15B.

For focusing purposes, a rotary knob 53 is arranged on the folding bridge 4 in the exemplary embodiment illustrated here, by means of which rotary knob the first focusing unit 52A and the second focusing unit 52B can be displaced together along the two optical axes 10 and 11. In a further embodiment, provision is made for the first objective 14A and the second objective 14B (or at least units of the first objective 14A and of the second objective 14B) to be adjusted relative to one another.

In the exemplary embodiment illustrated here, both the first objective 14A and the second objective 14B generate a real image, upside-down relative to the observed object O, in an image plane associated with the respective objective 14A, 14B. The first prism system 16A (first image stabilizing unit) associated with the first objective 14A and the second prism system 16B (second image stabilizing unit) associated with the second objective 14B are used for image erection. Hence the upside-down image is re-erected and imaged in a new image plane-the left intermediate image plane 23A or the right intermediate image plane 23B. The first prism system 16A (first image stabilizing unit) and the second prism system 16B (second image stabilizing unit) can be embodied as Abbe-König prism system, Schmidt-Pechan prism system, Uppendahl prism system, Porro prism system or another prism system variant.

By way of example, a first field stop that sharply delimits the field of view is arranged in the left intermediate image plane 23A. Furthermore, a second field stop that sharply delimits the field of view can be arranged for example in the right intermediate image plane 23B.

The first eyepiece 17A is used for imaging the image of the left intermediate image plane 23A into an arbitrary distance, e.g. into infinity or into a different distance. Furthermore, the second eyepiece 17B is used for imaging the image of the right intermediate image plane 23B into an arbitrary distance, e.g. into infinity or into a different distance.

The first aperture stop 54A of the first optical subsystem 12 and the second aperture stop 54B of the second optical subsystem 13 can be formed either by a mount of an optical element of the corresponding optical subsystem 12, 13, generally by the mount of the lenses of the first front unit 51A or of the second front unit 51B, or by a separate stop. It can be imaged in the beam direction through the corresponding optical subsystem 12 or 13 into a plane which lies in the beam direction behind the corresponding eyepiece 17A or 17B and is typically at a distance of 5 to 25 mm therefrom. This plane is called the plane of the exit pupil.

In order to protect the user against laterally incident light, a pull-out, turn-out or foldable first eyecup 55A can be provided at the first eyepiece 17A and a pull-out, turn-out or foldable second eyecup 55B can be provided at the second eyepiece 17B.

Figure 2A:
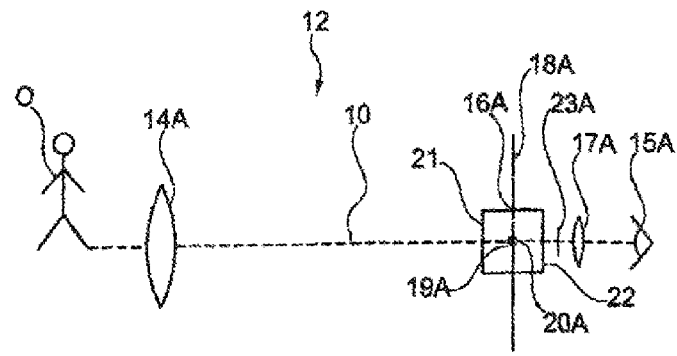
FIG. 2A shows a schematic illustration of a first optical subsystem.

FIG. 2A shows a schematic illustration of the first optical subsystem 12 arranged in the first housing part 2. The second optical subsystem 13 arranged in the second housing part 3 has an identical design to the first optical subsystem 12. Consequently, the explanations below with respect to the first optical subsystem 12 are also applicable to the second optical subsystem 13.

As can be seen from FIG. 2A, the first objective 14A, the first image stabilizing unit 16A and the first eyepiece 17A are arranged along the first optical axis 10 from the object O in the direction of the first eye 15A of the user. In the exemplary embodiment illustrated here, the first image stabilizing unit 16A is embodied as a prism erecting system. As an alternative thereto, provision is made in a further exemplary embodiment for the first image stabilizing unit 16A to be embodied as a lens erecting system. As mentioned above, the second optical subsystem 13 has an identical design to the first optical subsystem 12. Thus, the second prism system here is embodied as second image stabilizing unit 16B.

FIG. 2B shows a further schematic illustration of the field glasses 1. FIG. 2B is based on FIG. 1B. Identical components are provided with identical reference signs. FIG. 2B now also shows the movement devices for the first image stabilizing unit 16A and the second image stabilizing unit 16B. The first image stabilizing unit 16A is arranged in a first Cardan-type mount 60A. The second image stabilizing unit 16B is arranged in a second Cardan-type mount 60B.

The arrangement of the two image stabilizing units 16A and 16B is illustrated in more detail in FIG. 2C. The first Cardan-type mount 60A has a first outer suspension 61A, which is arranged on the first housing part 2 via a first axis 18A. The first outer suspension 61A is arranged in a manner rotatable about the first axis 18A. Furthermore, the first Cardan-type mount 60A has a first inner suspension 62A, which is arranged in a rotatable manner on the first outer suspension 61A via a second axis 19A. The first inner suspension 62A is rotated about the second axis 19A by means of a first drive unit 24A. Furthermore, provision is made for a second drive unit 24B, by means of which the first outer suspension 61A is rotated about the first axis 18A. FIG. 2E shows the abovementioned details in a magnified illustration. The first image stabilizing unit 16A is held on the first inner suspension 62A by means of clamping holders 71.

The second image stabilizing unit 16B is arranged on the second Cardan-type mount 60B. The second Cardan-type mount 60B has a second outer suspension 61B, which is arranged on the second housing part 3 via a third axis 18B. The second outer suspension 61B is arranged in a manner rotatable about the third axis 18B. Furthermore, the second Cardan-type mount 60B has a second inner suspension 62B, which is arranged in a rotatable manner on the second outer suspension 61B via a fourth axis 19B. The second inner suspension 62B is rotated about the fourth axis 19B by means of a third drive unit 24C. Furthermore, a fourth drive unit 24D is provided, by means of which the second outer suspension 61B is rotated about the third axis 18B.

As mentioned above, FIG. 2A shows the first optical subsystem 12. The first image stabilizing unit 16A is arranged by means of the first Cardan-type mount 60A in such a way that it is mounted in a manner rotatable about two axes arranged at right angles to one another, namely about the first axis 18A and about the second axis 19A, which projects into the plane of the drawing. The first axis 18A and the second axis 19A intersect at a first intersection point 20A. The first intersection point 20A is arranged such that it differs from a first optically neutral point on the first optical axis 10.

The first image stabilizing unit 16A has a first entrance surface 21 and a first exit surface 22. The first exit surface 22 is arranged at a distance in a range of 1 mm to 20 mm from the left intermediate image plane 23A. By way of example, the first exit surface 22 is arranged at a distance in a range of 2 mm to 15 mm from the left intermediate image plane 23A. As an alternative thereto, provision is made for the first exit surface 22 to be arranged at a distance in a range of 3 mm to 12 mm from the left intermediate image plane 23A.

As already mentioned above, the statements made above and below with respect to the first optical subsystem 12 are correspondingly applicable to the second optical subsystem 13.

Figure 3:
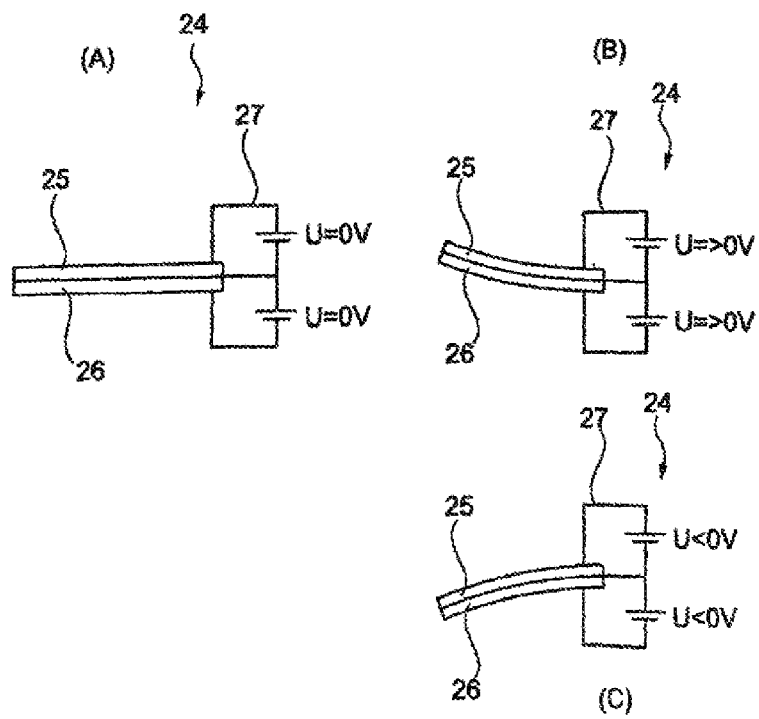
FIGS. 3A to 3C show schematic illustrations of a piezo-bending actuator.

FIGS. 3A-3C show schematic illustrations of a drive unit 24 in the form of a piezo-bending actuator, wherein an actuator is understood to mean an actuating element which can produce a force or a movement. Such an actuating element is often also designated as actuator in the literature. The first drive unit 24A, the second drive unit 24B, the third drive unit 24C and the fourth drive unit 24D are constructed identically to the drive unit 24, for example.

FIG. 3A shows a schematic illustration of the drive unit 24. The drive unit 24 comprises a first piezo-ceramic 25 and a second piezo-ceramic 26, which are arranged one on top of the other. By means of a voltage unit 27, both the first piezo-ceramic 25 and the second piezo-ceramic 26 can be supplied with a voltage. Expressed differently, a first voltage is applied to the first piezo-ceramic 25, and a second voltage is applied to the second piezo-ceramic 26. The two aforementioned voltages at the first piezo-ceramic 25 and at the second piezo-ceramic 26 are connected with opposite polarity, such that, by way of example, the first piezo-ceramic 25 expands, on the one hand, and the second piezo-ceramic 26 contracts, on the other hand. As a result, the overall arrangement of the first piezo-ceramic 25 and of the second piezo-ceramic 26 flexes, as illustrated in FIGS. 3B and 3C. These movements are then used to move the first image stabilizing unit 16A or the second image stabilizing unit 16B, as explained in greater detail below.

Reference is explicitly made to the fact that the invention is not restricted to the above-described drive unit 24 in the form of a piezo-bending actuator. Rather, use can be made of any type of drive unit which is suitable for performing a movement of the first image stabilizing unit 16A or of the second image stabilizing unit 16B. This also includes drive units that do not operate on the basis of piezo-technology. Further suitable drive units on the basis of piezo-technology are, for example, a piezo-linear actuator, a piezo-traveling wave actuator or an ultrasound motor. Piezo-actuators are particularly well suited since these have a strong self-locking effect, and so additional locking of the first image stabilizing unit 16A or of the second image stabilizing unit 16B can be dispensed with. Furthermore, the energy consumption thereof is very low, and so the service life of batteries used for the voltage supply is longer.

Provision is made for the movement of the first image stabilizing unit 16A or of the second image stabilizing unit 16B, and hence also for the position of the first image stabilizing unit 16A or of the second image stabilizing unit 16B, to be monitored by means of at least one sensor. By way of example, a first sensor is provided for a movement relative to the first axis 18A and a second sensor is provided for a movement relative to the second axis 19A. Additionally or alternatively, a third sensor is provided for a movement relative to the third axis 18B and a fourth sensor is provided for a movement relative to the fourth axis 19B. By way of example, a Hall sensor is used as a sensor. However, the invention is not restricted to this type of sensor. Rather, use can be made of any suitable type of sensor and also of any suitable number of sensors. The aforementioned sensor serves for improving the quality of the image stabilization. Reference is explicitly made to the fact that the invention is not restricted to the use of such a sensor. Rather, it is also possible for no sensor to be provided in the invention.

Figure 4:
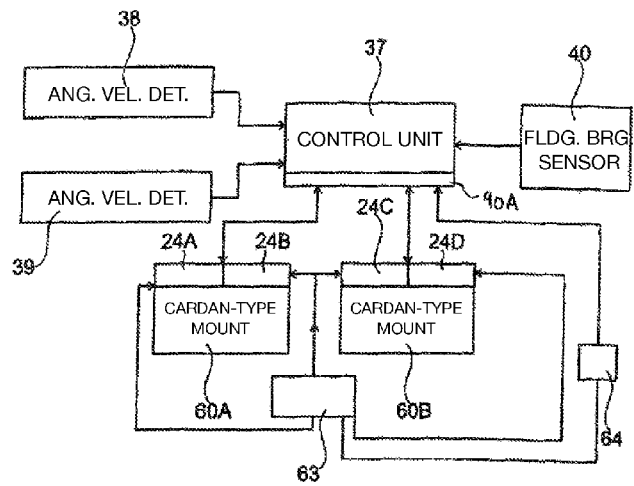
FIG. 4 shows a schematic illustration of a first block diagram of control and measurement units.

FIG. 4 shows a schematic illustration of a block diagram of control and measurement units for image stabilization in the optical system in the form of the field glasses 1. Firstly, the first Cardan-type mount 60A of the first image stabilizing unit 16A, the first drive unit 24A and the second drive unit 24B, which are arranged in the first housing part 2, and, secondly, the second Cardan-type mount 60B of the second image stabilizing unit 16B, the third drive unit 24C and the fourth drive unit 24D, which are arranged in the second housing part 3, are connected to a control and monitoring unit 37 (e.g. a microcontroller). The control and monitoring unit 37 is connected to a first filter unit 90A, which is still referred to in more detail below. Furthermore, the control and monitoring unit 37 is in turn connected to a first angular-velocity detector 38 and to a second angular-velocity detector 39. The first angular-velocity detector 38 serves to detect movements of the field glasses 1 and it is arranged in the first housing part 2. The second angular-velocity detector 39 also serves to detect movements of the field glasses 1 and it is arranged in the first housing part 2. By way of example, the aforementioned movements are rotational and/or translational trembling movements.

It is also possible to see from FIG. 4 that the exemplary embodiment depicted here has a voltage supply unit 63, which is connected to the first drive unit 24A, to the second drive unit 24B, to the third drive unit 24C and to the fourth drive unit 24D for the purposes of supplying the aforementioned drive units with a voltage. By way of example, the voltage supply unit 63 is embodied as a (rechargeable) battery, the available voltage of which is measured by a voltage measurement unit 64. The voltage measurement unit 64 is connected to the control and monitoring unit 37.

Moreover, the control and monitoring unit 37 is connected to a folding-bridge sensor 40. The use of the folding-bridge sensor 40 has the following reasoning. The relative location of the rotational axes (namely, firstly, the first axis 18A and the second axis 19A of the first image stabilizing unit 16A and, secondly, the third axis 18B and the fourth axis 19B of the second image stabilizing unit 16B) changes when the eye spacing is set by way of the folding bridge 4. In order to be able to obtain a precise setting of the rotational movement of the first image stabilizing unit 16A relative to the second image stabilizing unit 16B for stabilizing the image by virtue of positioning the first image stabilizing unit 16A and the second image stabilizing unit 16B, it is desirable to know the precise relative location of the respective rotational axes. The folding-bridge sensor 40 now establishes a so-called folding-bridge angle $\alpha$ between a first hinge part axis 72 of the first hinge part 5 and a second hinge part axis 73 of the second hinge part 6, wherein the first hinge part axis 72 and the second hinge part axis 73 have a common point of intersection with the articulation axis 74 (cf. FIGS. 2C and 2D). By way of example, provision is made in this case for determining the actual folding-bridge angle $\alpha$ by means of the folding-bridge sensor 40, which will be explained below. By way of example, the folding-bridge angle $\alpha$ in FIG. 2C, in which the first axis 18A and the third axis 18B are arranged parallel to one another, can already be 175°. FIG. 2D now illustrates an alignment of the first hinge part axis 72 and of the second hinge part axis 73 in which the folding-bridge angle $\alpha$ is 145°, for example. The actual folding-bridge angle $\alpha$ with respect to the first axis 18A and the third axis 18B is then the difference between the two measured folding-bridge angles, i.e. 30°. The folding-bridge angle determined in this or a similar way now makes it possible to transform coordinates of a first coordinate system of structural units of the first housing part 2 into coordinates of a second coordinate system of structural units of the second housing part 3.

The position (rotary position) of the first image stabilizing unit 16A and the position (rotary position) of the second image stabilizing unit 16B are set, for example, as outlined below. An angular velocity due to a movement of the field glasses 1 relative to the observed surroundings is detected by means of the first angular-velocity detector 38 and the second angular-velocity detector 39. The first angular-velocity detector 38 and the second angular-velocity detector 39 supply angular-velocity signals which are dependent on the movement. Rotary angles about the axes of rotation of the first image stabilizing unit 16A (e.g. the first axis 18A and the second axis 19A) and rotary angles about the axes of rotation of the second image stabilizing unit 16B (e.g. the third axis 18B and the fourth axis 19B) are established in the control and monitoring unit 37 by means of the angular-velocity signals. The rotary angles established in this manner are now converted into first correction angles, about which the first image stabilizing unit 16A needs to be rotated in order to be positioned in space. Furthermore, a second correction angle is calculated using the rotary angles, about which second correction angle the second image stabilizing unit 16B needs to be rotated in order to be positioned in space for image stabilization purposes. Furthermore, care should be taken that the point of intersection of the axes of rotation does not correspond with the optically neutral point of the field glasses 1. By way of example, the consequence thereof for the first optical subsystem 12 in the first housing part 2 is that the first intersection point 20A of the first axis 18A and the second axis 19A does not correspond to the optically neutral point of the field glasses 1 on the first optical axis 10. Therefore, the established angle of rotation should be multiplied by a factor dependent on the field glasses 1 in order to obtain the necessary correction angle. Here, the relative location of measurement axes of the two angular-velocity detectors 38 and 39 and of the axes of rotation of the first image stabilizing unit 16A and the second image stabilizing unit 16B should be taken into account. The appropriate correction angle is obtained by suitable transformation. By way of example, provision is made for the location of the measurement axes of the two angular-velocity detectors 38 and 39 to correspond to the location of the first axis 18A and the second axis 19A of the first image stabilizing unit 16A. Then, the angles of rotation of the first image stabilizing unit 16A can be transformed into angles of rotation of the second image stabilizing unit 16B by means of the established folding-bridge angle α.

Figure 5:
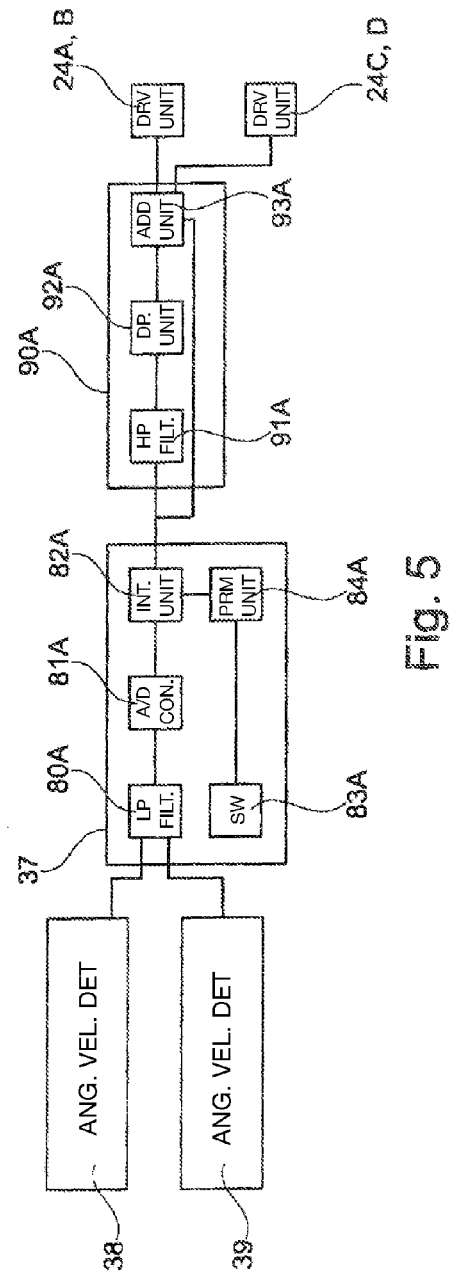
FIG. 5 shows a further schematic illustration of the first block diagram of control and measurement units in accordance with FIG. 4.

FIG. 5 shows a further block diagram, which is based on FIG. 4. Equivalent units are provided with the same reference sign. FIG. 5 elucidates the relationship between the angular-velocity detectors 38 and 39, the control and monitoring unit 37 and the drive units 24A to 24D. As already mentioned above, the control and monitoring unit 37 is connected to the first angular-velocity detector 38 and the second angular-velocity detector 39. The control and monitoring unit 37 has a first low-pass filter 80A, which is connected directly to the first angular-velocity detector 38 and the second angular-velocity detector 39. A first analog-digital converter 81A is connected downstream of the first low-pass filter 80A. Furthermore, a first integration unit 82A is connected downstream of the first analog-digital converter 81A. Moreover, the control and monitoring unit 37 has a first operating mode switch 83A and a first parameter unit 84A. The first parameter unit 84A is connected to the first integration unit 82A and connected between the first operating mode switch 83A and the first integration unit 82A.

The type of the first low-pass filter 80A can be selected as desired. However, in a special embodiment of the field glasses 1, provision is made for use of a combination of an electric low-pass filter, a digital low-pass filter and a digital first order shelving filter, with the aforementioned filters being connected in series. What is advantageous about this combination of filters is that the input signal of the combination of the aforementioned filters is delayed by 45° in relation to the output signal of the combination of the aforementioned filters. Pure low-pass filters have a delay of 90°. A lower delay is advantageous for obtaining image stabilization in "real time".

In the embodiment of the field glasses 1 depicted here, provision is now made for identifying the type of pivoting (i.e. unwanted pivoting or wanted pivoting) and for undertaking image stabilization on the basis of the identified and determined type of pivoting.

To this end, an angular velocity due to a movement of the field glasses 1 relative to the observed surroundings is initially detected by means of the first angular-velocity detector 38 and the second angular-velocity detector 39. The first angular-velocity detector 38 and the second angular-velocity detector 39 supply angular-velocity signals which are dependent on the movement. The angular-velocity signal of the first angular-velocity detector 38 is fed to the control and monitoring unit 37. The angular-velocity signal of the second angular-velocity detector 39 is likewise fed to the control and monitoring unit 37. Expressed more precisely, the angular-velocity signal of the first angular-velocity detector 38 and the angular-velocity signal of the second angular-velocity detector 39 are fed to the first low-pass filter 80A.

The first low-pass filter 80A ensures that low frequencies are able to pass the first low-pass filter 80A in an unimpeded manner and are able to be fed to further signal processing for image stabilization purposes. The high frequencies (greater than 20 Hz) are filtered out by the first low-pass filter 80A. Therefore, these do not contribute to the image stabilization.

The filtered signal of the first low-pass filter 80A is forwarded to the first integration unit 82A by the first analog-digital converter 81A. The output signal of the first integration unit 82A is determined by equation 2, which is again reproduced below:

$$\Sigma(t_2)=\gamma(\Sigma(t_1))\cdot\Sigma(t_1)+\alpha(t_1),\quad\quad\text{[Equation 2]}$$

Reference is made to the text above in respect of the meaning of the individual variables in equation 2. The function γ can be set in the first parameter unit 84A by actuating the first operating mode switch 83A. It is possible to set the properties of the image stabilization by means of a specific selection of the function γ. By way of example, it is possible to select the duration for which image stabilization should occur or whether an image stabilization should only be implemented in the case of pivoting above a limit amplitude.

In one embodiment of the system described herein, the function γ is for example specified as follows:

$$\gamma(\Sigma)=\gamma_1-\gamma_2\Sigma\text{sign}(\Sigma),\quad\quad\text{[Equation 3]}$$

$\gamma_1$ is a freely selectable parameter which determines how quickly the output signal of the first integration unit 82A reduces to zero again for small amplitudes of the pivoting. If a small parameter $\gamma_1$ (e.g. 0.1) is selected, only higher frequencies remaining in the signal are used for the image stabilization. If the parameter $\gamma_1$ is close to 1 (e.g. 0.9), in principle all frequencies remaining in the signal are used for the image stabilization.

$\gamma_2$ is likewise a freely selectable parameter which determines the strength of the influence of the amplitude of the pivoting of the field glasses 1. In the case of small values of $\gamma_2$ (e.g. 0.1), high frequencies still remaining in the signal are used for the image stabilization at large amplitudes. If the parameter $\gamma_2$ is large (e.g. 0.9), this is already implemented in the case of small amplitudes.

The following applies to the sign function in equation 3: sign(x)=1 for x greater than or equal to 0 and sign(x)=−1 for x less than 0.

The output signal of the first integration unit 82A is now forwarded to the first filter unit 90A, which is described in detail below. The first filter unit 90A has a first high-pass filter 91A, a first damping unit 92A and a first addition unit 93A. The first high-pass filter 91A is connected to the first integration unit 82A. The first damping unit 92A is connected between the first high-pass filter 91A and the first addition unit 93A. Furthermore, the first addition unit 93A is connected to the first drive unit 24A, the second drive unit 24B, the third drive unit 24C and the fourth drive unit 24D.

The output signal of the first high-pass filter 91A and the output signal of the first integration unit 82A are initially added in the first addition unit 93A. The first addition signal generated hereby is now used in the drive units 24A to 24D for actuating the first Cardan-type mount 60A and the second Cardan-type mount 60B.

As already mentioned above, the first filter unit 90A satisfies equation 1. Prior to putting the field glasses 1 into operation, a limit frequency for the first high-pass filter 91A and a factor γ for the first damping unit 92A are established, for example experimentally, in such a way that the delay is sufficiently well compensated for and the amplitude of the movement has not been substantially reduced.

Now, angles of rotation about the axes of rotation of the first image stabilizing unit 16A and the second image stabilizing unit 16B are established. The established angles of rotation are now converted into correction angles, about which the first image stabilizing unit 16A and/or the second image stabilizing unit 16B must be rotated in order to be positioned in space.

Figure 6:
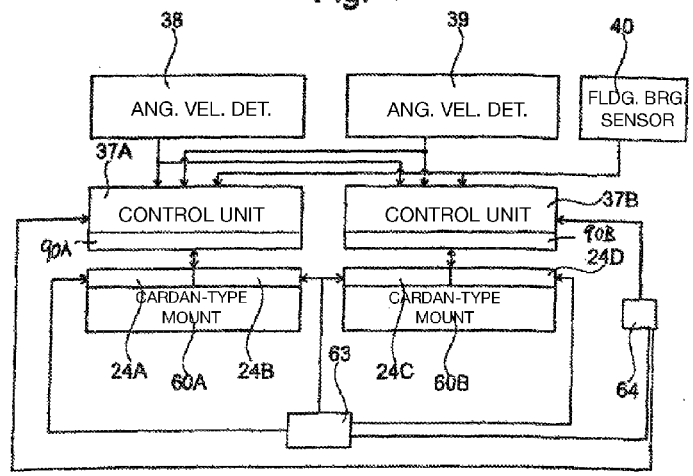
FIG. 6 shows a schematic illustration of a second block diagram of control and measurement units.

FIG. 6 is a block diagram of a further embodiment of control and measurement units, which is based on the exemplary embodiment of FIG. 4. Therefore, equivalent components are provided with the same reference sign. In contrast to the embodiment in accordance with FIG. 4, the embodiment in accordance with FIG. 6 has two control and monitoring units, namely a first control and monitoring unit 37A and a second control and monitoring unit 37B. The first control and monitoring unit 37A is connected to a first filter unit 90A, the first angular-velocity detector 38, the first Cardan-type mount 60A of the first image stabilizing unit 16A, the first drive unit 24A and the second drive unit 24B. By way of example, the first control and monitoring unit 37A is arranged in the first housing part 2. The second control and monitoring unit 37B is connected to a second filter unit 90B, the second angular-velocity detector 39, the second Cardan-type mount 60B of the second image stabilizing unit 16B, the third drive unit 24C and the fourth drive unit 24D. By way of example, the second control and monitoring unit 37B is arranged in the second housing part 3. The folding-bridge sensor 40 is connected to both the first control and monitoring unit 37A and the second control and monitoring unit 37B. Moreover, the first angular-velocity detector 38 is connected to the second control and monitoring unit 37B. Furthermore, the second angular-velocity detector 39 is connected to the first control and monitoring unit 37A. Accordingly, this exemplary embodiment in each case uses a separate control and monitoring unit for, on the one hand, the first optical subsystem 12 in the first housing part 2 and, on the other hand, for the second optical subsystem 13 in the second housing part 3, with, however, the angular-velocity detectors 38, 39 being used together for detecting movements of the field glasses 1. The voltage measurement unit 64 is connected to both the first control and monitoring unit 37A and the second control and monitoring unit 37B.

In principle, the exemplary embodiment in FIG. 6 works like the exemplary embodiment in FIG. 4, and so, initially, reference is made to the notes in relation to FIG. 4. However, the exemplary embodiment in FIG. 6 furthermore has the following differences, explained below, to FIG. 4.

Figure 7:
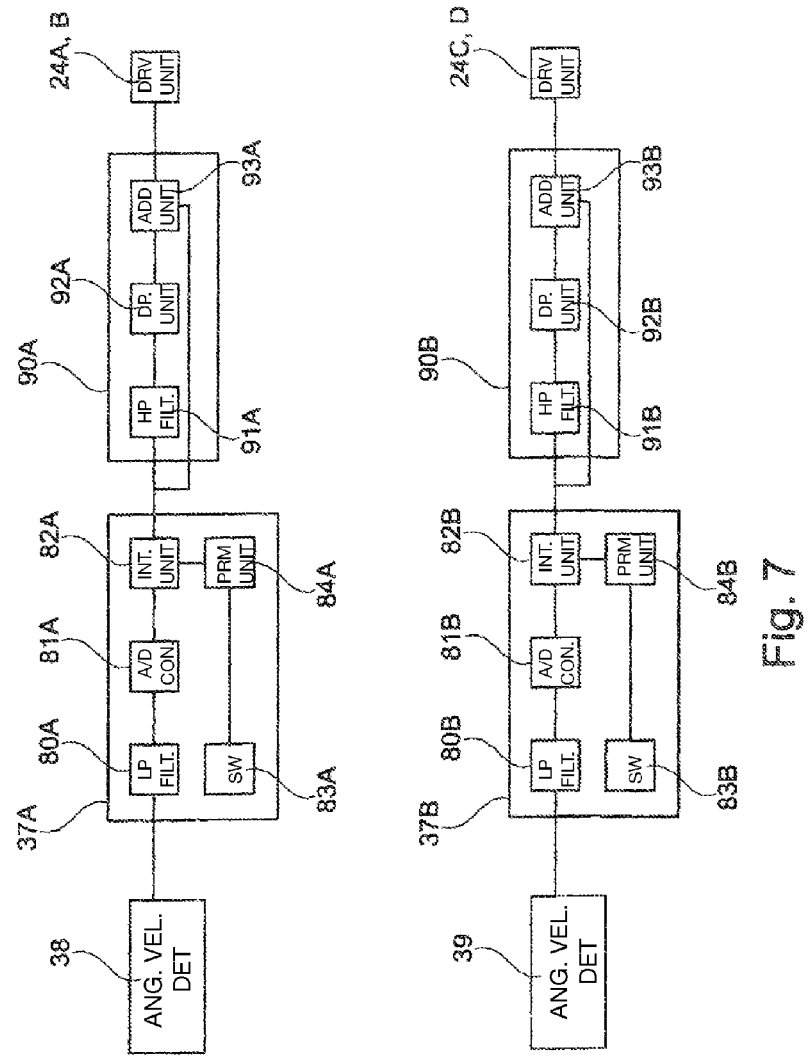
FIG. 7 shows a further schematic illustration of the second block diagram of control and measurement units in accordance with FIG. 6.
Figure 8:
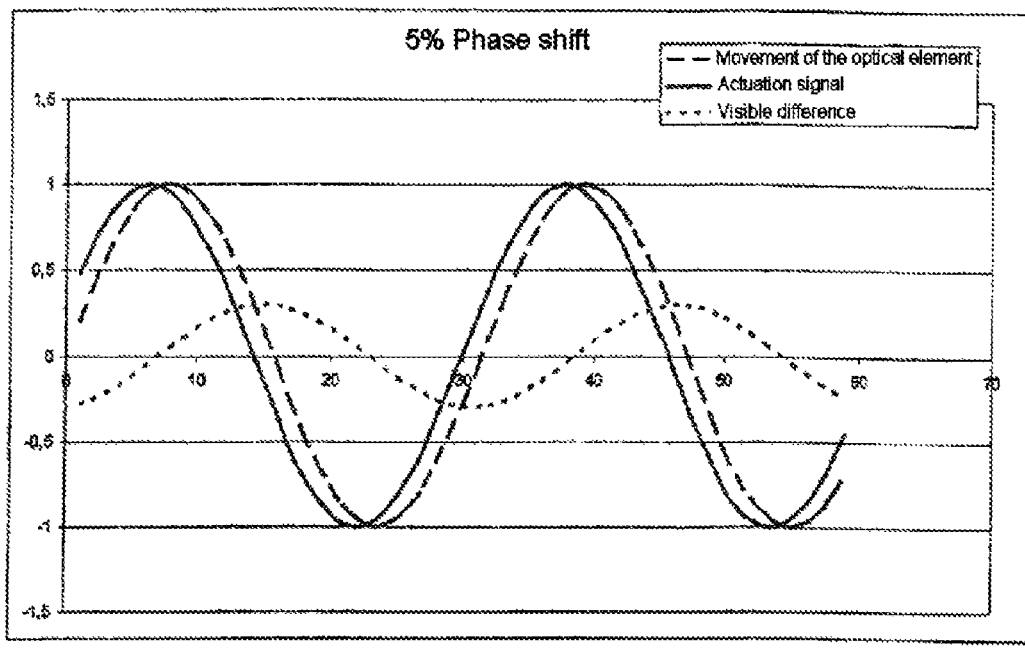
FIG. 8 shows a schematic illustration of a vibration profile from the prior art.
Figure 9:
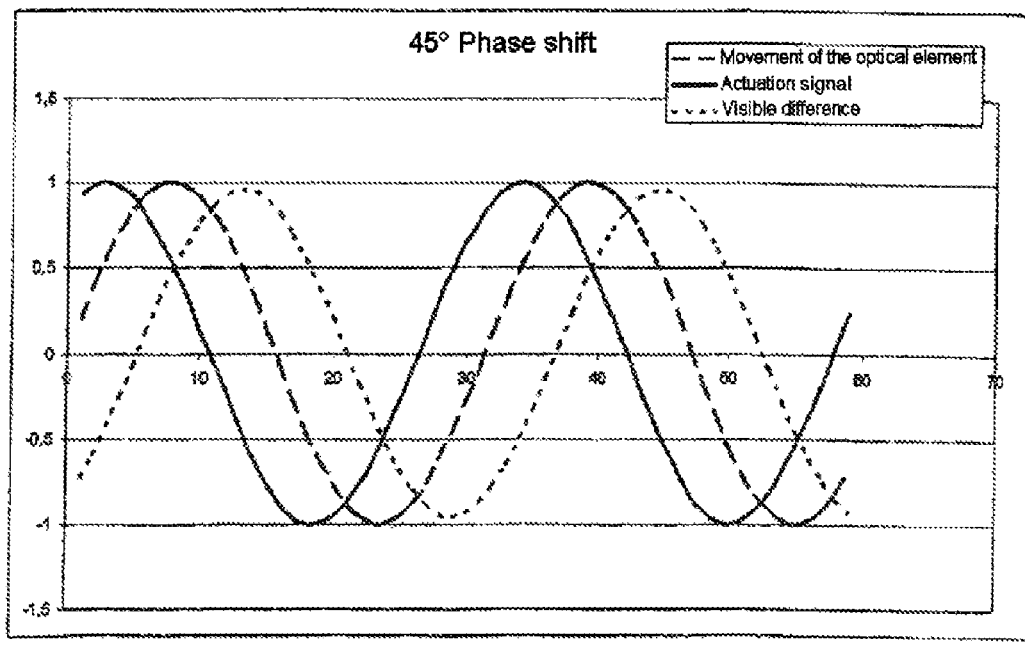
FIG. 9 shows a further schematic illustration of a vibration profile from the prior art.

FIG. 7 shows a further block diagram which is based on FIG. 6. Equivalent units are provided with the same reference sign. FIG. 7 elucidates the relationship between the angular-velocity detectors 38 and 39, the first control and monitoring unit 37A and the second control and monitoring unit 37B and the drive units 24A to 24D.

As already mentioned above, the first control and monitoring unit 37A is connected to the first angular-velocity detector 38. It furthermore has the setup which was already explained above in relation to FIG. 5.

What was also already mentioned above is that the second control and monitoring unit 37B is connected to the second angular velocity detector 39. The second control and monitoring unit 37B has a second low-pass filter 80B, which is directly connected to the second angular-velocity detector 39. A second analog-digital converter 81B is connected downstream of the second low-pass filter 80B. Furthermore, a second integration unit 82B is connected downstream of the second analog-digital converter 81B. Moreover, the second control and monitoring unit 37B has a second operating mode switch 83B and a second parameter unit 84B. The second parameter unit 84B is connected to the second integration unit 82B and connected between the second operating mode switch 83B and the second integration unit 82B.

The types of the two low-pass filters 80A and 80B can be selected as desired. However, in a special embodiment of the field glasses 1, provision is also made in this case for use of a combination of an electric low-pass filter, a digital low-pass filter and a digital first order shelving filter, with the aforementioned filters being connected in series.

In the embodiment of the field glasses 1 depicted here, provision is now made for identifying the type of pivoting (i.e. unwanted pivoting or wanted pivoting) and for undertaking image stabilization on the basis of the identified and determined type of pivoting. To this end, an angular velocity due to a movement of the field glasses 1 relative to the observed surroundings is initially detected by means of the first angular-velocity detector 38 and the second angular-velocity detector 39. The first angular-velocity detector 38 and the second angular-velocity detector 39 supply angular-velocity signals which are dependent on the movement. The angular-velocity signal of the first angular-velocity detector 38 is fed to the first control and monitoring unit 37A. The angular-velocity signal of the second angular-velocity detector 39 is fed to the second control and monitoring unit 37B. Expressed more precisely, the angular-velocity signal of the first angular-velocity detector 38 is fed to the first low-pass filter 80A and the angular-velocity signal of the second angular-velocity detector 39 is fed to the second low-pass filter 80B.

These two low-pass filters 80A and 80B ensure that low frequencies are able to pass the two low-pass filters 80A and 80B in an unimpeded manner and are able to be fed to further signal processing for image stabilization purposes. The high frequencies (greater than 20 Hz) are filtered out by the two low-pass filters 80A and 80B. Therefore, these do not contribute to the image stabilization.

In respect of the functionality of the first control and monitoring unit 37A and the second control and monitoring unit 37B, reference is made to the explanations regarding the control and monitoring unit 37 in FIG. 4. These apply analogously to the first control and monitoring unit 37A and the second control and monitoring unit 37B.

The output signal of the first integration unit 82A is now forwarded to the first filter unit 90A which was described in more detail further above in relation to FIG. 5. However, the first filter unit 90A in FIG. 7 differs from the first filter unit in FIG. 5 in that the first addition unit 93A is only connected to the first drive unit 24A and the second drive unit 24B.

The output signal of the second integration unit 82B is now forwarded to the second filter unit 90B. The second filter unit 90B has a second high-pass filter 91B, a second damping unit 92B and a second addition unit 93B. The second high-pass filter 91B is connected to the second integration unit 82B. The second damping unit 92B is connected between the second high-pass filter 91B and the second addition unit 93B. Furthermore, the second addition unit 93B is connected to the third drive unit 24C and the fourth drive unit 24D. The output signal of the second high-pass filter 91B and the output signal of the second integration unit 82B are initially added in the second addition unit 93B. The second addition signal generated hereby is now used in the third drive unit 24C and the fourth drive unit 24D for actuating the second Cardan-type mount 60B.

The second filter unit 90B likewise satisfies equation 1. Reference is made to the explanations above.

Now, angles of rotation about the axes of rotation of the first image stabilizing unit 16A and the second image stabilizing unit 16B are established. The established angles of rotation are now converted into correction angles, about which the first image stabilizing unit 16A and/or the second image stabilizing unit 16B must be rotated in order to be positioned in space.

The features of the invention disclosed in the present description, in the drawings and in the claims can be essential, both individually and in any combination, for realizing the invention in the various embodiments thereof.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An optical system for imaging an object, comprising:
   at least one first objective;
   at least one first image stabilizing unit;
   at least one first image plane, wherein, as seen from the first objective in a direction of the first image plane, the first objective is arranged first along a first optical axis, followed by the first image stabilizing unit and the first image plane;
   at least one first drive unit, which is coupled to the first image stabilizing unit and provided for moving the first image stabilizing unit; and
   at least one first control unit for actuating the first drive unit, wherein
   a first high-pass filter is connected between the first control unit and the first drive unit such that a signal from the first control unit is forwarded to the first high-pass filter,
   the first control unit has a first output line, at least one first low-pass filter, and at least one first integration unit which is connected downstream of the first low-pass filter,
   the first high-pass filter has a first filter output line,
   both the first output line and the first filter output line are coupled to a first addition unit such that an actuation signal from the first control unit and an output signal from the first high-pass filter are added to produce a first addition signal, and wherein
   the first addition unit is coupled to the first drive unit in such a way that the first addition signal is used for actuating the first drive unit and for moving the first image stabilizing unit.

2. The optical system as claimed in claim 1, wherein a first damping unit is connected between the first high-pass filter and the first drive unit.

3. The optical system as claimed in claim 1, wherein the optical system has at least one second drive unit, which is coupled to the first image stabilizing unit and provided for moving the first image stabilizing unit.

4. The optical system as claimed in claim 1, further comprising:
   at least one second objective;
   at least one second image stabilizing unit;
   at least one second image plane, wherein, as seen from the second objective in a direction of the second image plane, the second objective is arranged first along a second optical axis, followed by the second image stabilizing unit and the second image plane, and
   at least one second drive unit, which is coupled to the second image stabilizing unit and provided for moving the second image stabilizing unit.

5. The optical system as claimed in claim 4, further comprising:
   at least one second control unit for actuating the second drive unit;
   a second high-pass filter is connected between the second control unit and the second drive unit-such that a signal from the second control unit is forwarded to the second high-pass filter,
   the second control unit has a second output line,
   the second high-pass filter has a second filter output line,
   both the second output line and the second filter output line are coupled to a second addition unit such that an actuation signal from the second control unit and an output signal from the second high-pass filter are added to produce a second addition signal, and wherein
   the second addition unit is coupled to the second drive unit in such a way that the second addition signal is used for actuating the second drive unit and for moving the second image stabilizing unit.

6. The optical system as claimed in claim 5, wherein the second control unit has at least one second low-pass filter and at least one second integration unit, which is connected downstream of the second low-pass filter.

7. The optical system as claimed in claim 5, wherein a second damping unit is connected between the second high-pass filter and the second drive unit.

8. The optical system as claimed claim 5, further comprising:
   at least one movement detector for detecting a movement of the optical system coupled to the second control unit.

9. The optical system as claimed in claim 4, further comprising:
   at least one third drive unit, which is coupled to the second image stabilizing unit and provided for moving the second image stabilizing unit.

10. The optical system as claimed in claim 4, wherein the first objective, the first image stabilizing unit and the first image plane are arranged in a first housing and the second objective, the second image stabilizing unit and the second image plane are arranged in a second housing.

11. The optical system as claimed in claim 10, wherein the first housing is connected to the second housing by at least one folding bridge having a first hinge part coupled to the first housing, and a second hinge part coupled to the second housing.

12. The optical system as claimed in claim 1, further comprising:
   at least one movement detector for detecting a movement of the optical system coupled to the first control unit.

13. The optical system as claimed in claim 1, wherein the at least one first integration unit has a single input.

14. A method for operating an optical system, comprising:
   feeding a control signal of a control unit to a high-pass filter, wherein the control signal is provided by an integration unit of the control unit that receives an output signal from a low-pass filter of the control unit;
   the high-pass filter generating a filter signal;
   adding the filter signal and the control signal to provide an actuation signal; and
   feeding the actuation signal to a drive unit to move an image stabilizing unit.

15. The method for operating an optical system as claimed in claim 14, wherein the integration unit has a single input.

16. An optical system for imaging an object, comprising:
   an objective;
   an image plane arranged along an optical axis of the objective;
   an image stabilizing unit arranged along the optical axis and between the objective and the image plane;
   a drive unit coupled to the image stabilizing unit;
   an addition unit coupled to the drive unit;
   a high-pass filter coupled to the addition unit; and
   a control unit coupled to the high-pass filter and the addition unit and including a low-pass filter and an integration unit that receives an output signal from the low-pass filter, wherein an output signal from the addition unit corresponding to signals from the control unit and the high-pass filter actuates the drive unit to move the image stabilizing unit.

17. The optical system as claimed in claim 16, wherein a damping unit is coupled between the high-pass filter and the drive unit.

18. The optical system as claimed in claim 16, further comprising:
   at least one movement detector, coupled to the control unit, that detects movement of the optical system.

19. The optical system as claimed in claim 16, wherein the integration unit has a single input.

* * * * *